J. L. ROOP.
FILM DRIVING MEANS.
APPLICATION FILED AUG. 25, 1919.
1,437,152.
Patented Nov. 28, 1922.
2 SHEETS—SHEET 1.
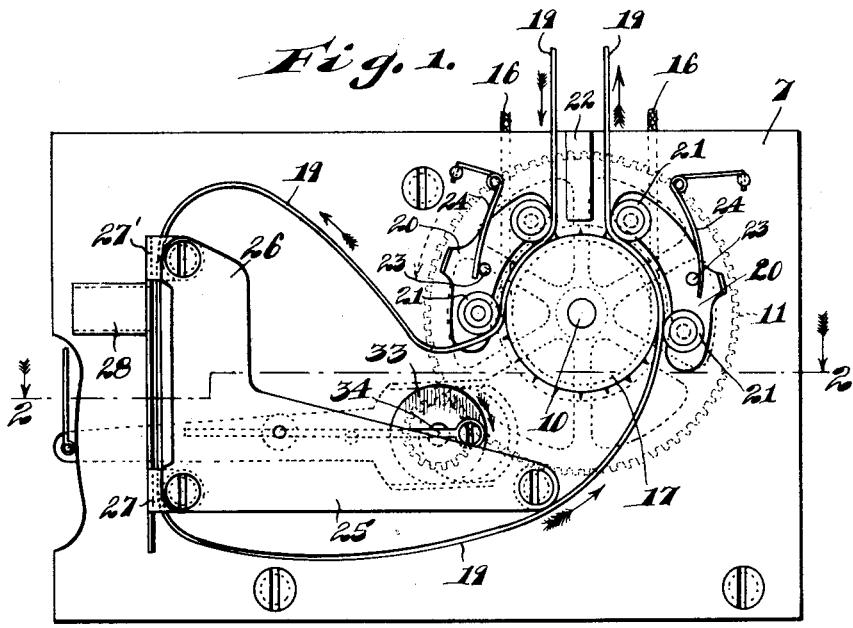
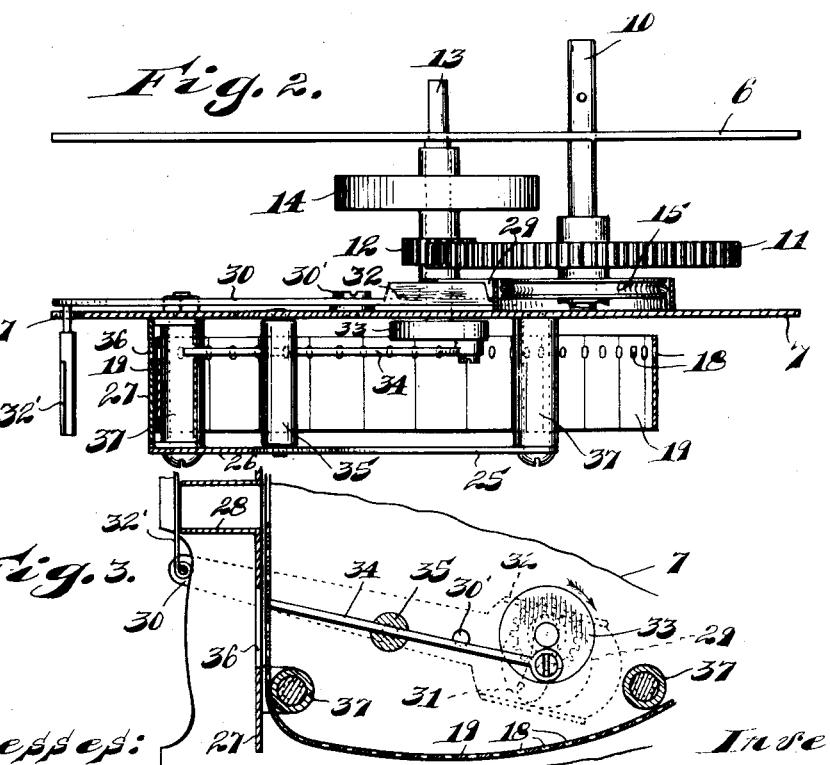
Witnesses:
E. E. Wessels
Thos. S. Donnelly
Inventor:
Joseph L. Roop,
By Joshua R. H. Potts
Attorney.

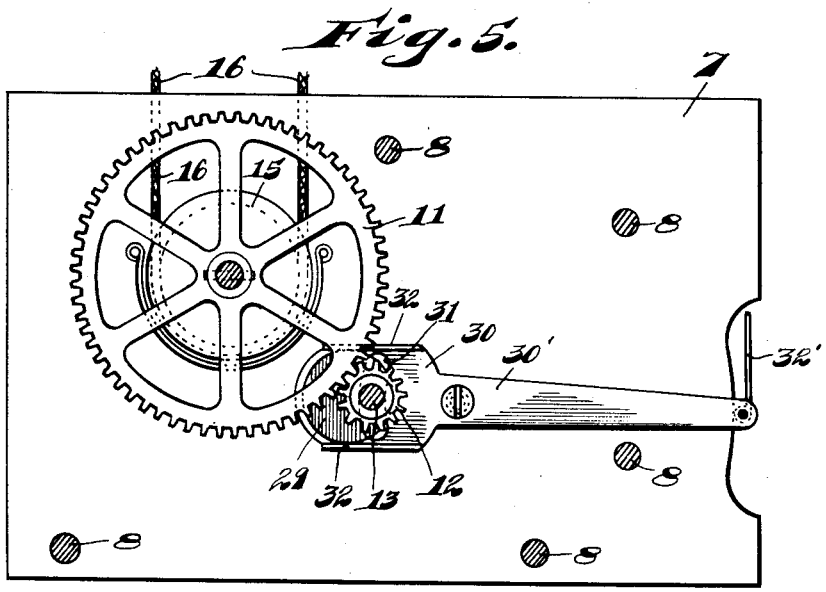
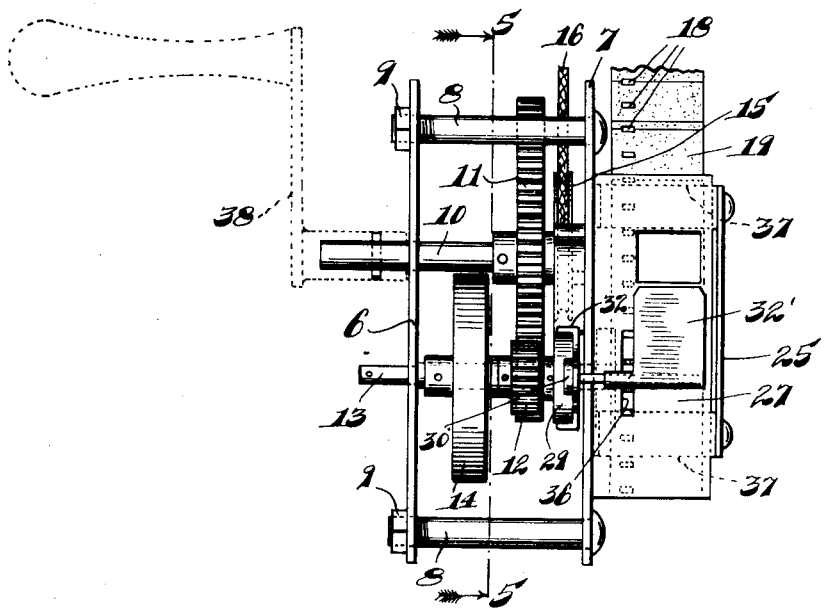

Patented Nov. 28, 1922.

1,437,152

UNITED STATES PATENT OFFICE.

JOSEPH L. ROOP, OF LOS ANGELES, CALIFORNIA.

FILM-DRIVING MEANS.

Application filed August 25, 1919. Serial No. 319,634.

*To all whom it may concern:*

Be it known that I, JOSEPH L. ROOP, a citizen of the United States, and a resident of the city of Los Angeles, county of Los Angeles, and State of California, have invented certain new and useful Improvements in Film-Driving Means, of which the following is a specification.

My invention relates to new and useful improvements in film driving means and has for its object the provision of a device capable of driving a film having perforations at one side only.

Other objects will appear hereinafter.

The invention consists in the combinations and arrangements of parts hereinafter described and claimed.

The invention will be best understood by reference to the accompanying drawings forming a part of this specification, and in which, Fig. 1 is a side elevational view of my invention.

Fig. 2 is a sectional view taken on substantially line 2—2 of Fig. 1.

Fig. 3 is a fragmentary sectional view showing film actuating arm.

Fig. 4 is a front elevational view of my invention.

Fig. 5 is an enlarged side elevational view showing parts in detail.

The approved form of construction comprises a housing 6 in which my invention is designed to be enclosed. This housing 6, a part of one wall only of which is shown, is comparatively small and provided with slits through which the film is adapted to pass into the interior, the films being upon rollers which are mounted exterior of the housing 6. My invention is designed primarily for use by amateurs, and when mounted in the housing 6, comprises a camera of very reduced size and capable of being easily carried about by the operator, as would be an ordinary camera. Secured within the housing 6 is a partition 7, the same being secured to the housing by suitable bolts 8 and nuts 9. Mounted upon the wall of the housing 6 and the partition 7 and projecting exteriorly of the housing is a shaft 10 one end of which is provided with a handle 38. Mounted upon the shaft 10, intermediate the partition 7 and the wall of the housing to which the shaft projects, is a gear 11 which meshes with a pinion 12 which is mounted upon an additional shaft 13 similarly mounted upon the partition 7 and the wall of the housing 6. Positioned upon the shaft 13, intermediate the wall of the housing 6 and the pinion 12, is a flywheel 14. Mounted upon the shaft 10, intermediate the gear 11 and the partition 7, is a grooved pulley 15 cooperating with which is a suitable belt 16. Mounted upon the shaft 10 adjacent the opposite side of the partition 7, is a sprocket-wheel 17, the sprockets of which are adapted to engage in perforations 18 provided in a film 19, the perforations 18 being provided along one side solely of the film 19. It will be noticed that two of the perforations are provided for each of the exposures which are to be made on the film, each exposure being enclosed between transversely extending lines shown on the film in Fig. 2. Pivotally mounted upon the partition 7 are segmental supports 20 bearing rollers 21 at opposite ends. These rollers serve the function of retaining the film 19 in contact with the sprocket-wheel 17, and consequently assure engagement of the sprockets with the perforations 18. Positioned upon the partition 7 is a block 22 which extends downwardly to the wheel 17 and serves as a guide for the film as it enters the camera and leaves the camera. Resilient springs 24 are mounted upon the partition 7 and cooperate with stops 23 which are mounted upon the segmental supports 20, and serve to retain the rollers 21 in close engagement with the film. Mounted upon the partition 7 is a bracket 25 having an upwardly extending arm 26 provided upon which is a laterally extending member 27', a similar member 27 being provided at the lower edge of the member 25, for the purpose of guiding the film in its downward movement, as will be readily understood. Upon a vertically extending member which serves to connect members 27 and 27', is a lens barrel 28.

Rigidly mounted eccentrically upon the shaft 13, intermediate the partition 7 and the pinion 12, is a disk 29. Mounted upon the shaft 13 and engaging the disk 29 is a shutter arm 30 having an arcuate slot 31 therein, through which the shaft 13 passes. As clearly seen in Fig. 5, a flange 32 is provided at the upper and lower edges of the member 30 where the same engages the member 29, these flange portions forming bearing surfaces which contact with the member 29 upon the rotation of the shaft 13. Provided at the outer end of the member 30 is a shutter 32' which is adapted to move vertically relatively to the lens barrel 28, serving to close the lens barrel 28 when in its upper position and to open it when in its lower position. Mounted upon the shaft 13 on the opposite side of the partition 7 from which the member 30 is mounted, is a disk 33 upon which is pivotally eccentrically mounted at one end an accelerating arm 34, said arm 34 projecting through a guide member 35 which is pivotally mounted upon the partition 7. In operation, the gear-wheel 11 is rotated and the film is fed downwardly into the camera by the sprocket-wheel in the direction indicated by the arrows in Fig. 1. Upon the rotation of the gear 11 the shaft 13 is rotated by virtue of the meshing arrangement of the pinion 12 with the gear 11. The eccentrically mounted disk 29 also rotates with the shaft 13 and thereby causes an oscillation of the shutter bearing arm 30 which is pivotally mounted at 30' to the partition 7, thereby causing the shutter 32' to move rapidly up and down intermittently, opening and closing the lens barrel 28. At the same time the disk 33 rotates, causing the arm 34 to intermittently move upwardly and downwardly, the mounting of the same being such that, when in its uppermost position, the arm 34 is thrust upward into engagement with the film 19, and when at its lowest position, is caused to move backward out of engagement with the film, a slot 36 being provided in the front wall of the retaining member which supports the lens thereof. It is thus seen that the arm 34 will engage the film and draw the same downward rapidly, while at the same time the shutter 32' is serving as a closure for the lens barrel 28, so that the film is never exposed while moving. Mounted upon the wall 7 are suitable rollers 37 which serve as guides for the film in its movements.

With a device of this class, means for driving the film and intermittently accelerating the same are provided, with which a film having perforations at one side only may be used. The standard film, as now used, has perforations along both edges and is twice the width of the film which is used with my invention. Consequently, the standard film may be obtained and slit into two portions, thus providing twice the number of exposures with the same amount of film.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent, is:—

1. In combination with a motion picture apparatus comprising a housing and a film guide, of a film passing through said guide; a transverse shaft in said housing; means on said shaft engaging said film for feeding said film into and out of said housing; spring controlled means at opposite sides of said film feeding means for holding said film into engagement with said feeding means; a second transverse shaft in said housing and operatively connected to said first named shaft; a disc on said shaft; an oscillatory transverse bearing member in said housing; and an arm eccentrically carried by said disc, passing through said bearing member and adapted to be moved into engagement with said film for moving said film through said guide, substantially as described.

2. In combination with a motion picture apparatus comprising a housing and a film guide, of a film passing through said guide; a transverse shaft in said housing; means on said shaft engaging said film for feeding said film into and out of said housing; a second transverse shaft in said housing and operatively connected to said first named shaft; a disc carried by said second named shaft; an oscillatory bearing member in said housing; an arm eccentrically carried by said disc, passing through said bearing member and adapted to be moved into engagement with said film for moving said film through said guide; a second disc eccentrically carried by said second named shaft; an arm pivotally carried by said housing, there being oppositely arranged lateral flanges on said arm at one end thereof for engagement with the periphery of said second named disc; and a shutter carried on the other end of said arm adapted to move vertically relatively to said lens, substantially as described.

In testimony whereof I have signed my name to this specification in the presence of two subscribing witnesses.

JOSEPH L. ROOP.

Witnesses:
ALLEN TURNER,
MARSHALL E. ROOP.